United States Patent
Svoboda et al.

(10) Patent No.: US 8,688,363 B2
(45) Date of Patent: Apr. 1, 2014

(54) AIRCRAFT SYSTEMS AND METHODS WITH ACTIVE DECELERATION CONTROL

(75) Inventors: Jiri Svoboda, Morristown, NJ (US);
Mike Jackson, Morristown, NJ (US);
Michal Polansky, Morristown, NJ (US);
Erwan Paricaud, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 261 days.

(21) Appl. No.: 13/095,093

(22) Filed: Apr. 27, 2011

(65) Prior Publication Data

US 2011/0270470 A1 Nov. 3, 2011

Related U.S. Application Data

(60) Provisional application No. 61/329,988, filed on Apr. 30, 2010.

(51) Int. Cl.
*G06F 19/00* (2011.01)

(52) U.S. Cl.
USPC .................................. 701/121; 701/5; 701/15

(58) Field of Classification Search
USPC ........................................ 701/5, 15, 120, 121
See application file for complete search history.

(56) References Cited

U.S. PATENT DOCUMENTS

| 4,325,123 A | 4/1982 | Graham et al. |
| 4,346,288 A | 8/1982 | Foster |
| 5,121,325 A | 6/1992 | DeJonge |
| 5,574,647 A | 11/1996 | Liden |
| 5,739,770 A | 4/1998 | Liden |
| 2005/0143904 A1* | 6/2005 | Haas ............................ 701/120 |
| 2005/0283306 A1 | 12/2005 | Deker |
| 2006/0273928 A1* | 12/2006 | Van Boven ................... 340/945 |
| 2009/0259351 A1 | 10/2009 | Wachenheim et al. |

FOREIGN PATENT DOCUMENTS

WO 02093281 A1 11/2002

OTHER PUBLICATIONS

Choi—Lead Compensator ( found at: http://www.egr.msu.edu/classes/me451/jchoi/2008/notes/ME451_L21_RootLocusLag.pdf).*
EP Communication, EP 11164213.8-2206 dated Apr. 26, 2012.
EP Communication, EP 11164213.8-2206 dated Feb. 3, 2012.

* cited by examiner

*Primary Examiner* — Khoi Tran
*Assistant Examiner* — Adam Mott
(74) *Attorney, Agent, or Firm* — Ingrassia Fisher & Lorenz, P.C.

(57) ABSTRACT

A system is provided for controlling the speed of an aircraft during a deceleration segment between a first state associated with a first speed and a first time and a second state associated with a second speed and a second time. The system includes a navigation system configured to determine the first state; a guidance system configured to determine the second state; and an active deceleration system coupled to the navigation system and the guidance system and configured to construct the deceleration segment between the first state and the second state with at least one intermediate speed between the first speed and the second speed.

18 Claims, 6 Drawing Sheets

AIRCRAFT SYSTEMS AND METHODS WITH ACTIVE DECELERATION CONTROL

PRIORITY CLAIM

This application claims the benefit of U.S. Provisional Application No. 61/329,988, filed Apr. 30, 2010, the disclosure of which is hereby incorporated by reference.

TECHNICAL FIELD

The present invention generally relates to aircraft systems and methods, and more particularly relates to the systems and methods for controlling the speed of an aircraft.

BACKGROUND

Commercial aircraft make extensive use of systems to plan and execute flights, control the aircraft, and manage a number of other aircraft operations. For example, such systems may include a flight management system (FMS) that generates flight plans with lateral segments and vertical segments to a destination. The flight plans may include details about the appropriate speeds, altitudes, and location during ascent, cruising, and descent modes of a flight. Particularly, the flight plans require the aircraft to be at a certain speed and altitude at a specified lateral position, and the FMS determines the most effective mechanisms for complying with these parameters.

Some modern air traffic systems also include a timing requirement such that the aircraft is expected to be at a designated speed, altitude, and location at a particular time. Given the already complex considerations of flight planning, as well as the uncertainty associated with implementing such planning, conventional aircraft systems may find the timing or other accuracy requirements to be challenging.

Accordingly, it is desirable to provide improved systems and methods for controlling the flight of an aircraft, particularly during descent with respect to speed, altitude, location, and time constraints. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a system is provided for controlling the speed of an aircraft during a deceleration segment between a first state associated with a first speed and a first time and a second state associated with a second speed and a second time. The system includes a navigation system configured to determine the first state; a guidance system configured to determine the second state; and an active deceleration system coupled to the navigation system and the guidance system and configured to construct the deceleration segment between the first state and the second state with at least one intermediate speed between the first speed and the second speed.

In accordance with another exemplary embodiment, a method is provided for controlling the speed of an aircraft during a deceleration segment between a first state associated with a first speed and a first time and a second state associated with a second speed and a second time. The method includes receiving the first state and the second state; constructing the deceleration segment between the first state and the second state with a series of changing speed targets; and flying the aircraft according to the deceleration segment

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein include aircraft systems and methods for controlling an aircraft during flight. Particularly, the system and methods are applicable to an aircraft decelerating during a descent segment between a first state and a second state, each having a location, speed, altitude, and time associated therewith. The systems and methods generate an interpolated segment between the first and second states, and then adjust the interpolated segment according to a lead factor to generate a lead deceleration segment. The lead deceleration segment is incorporated into the flight plan for generating flight commands. The systems and methods continue to update the interpolated segment and lead deceleration segment as the aircraft flies the flight plan to provide active control of the deceleration.

Figure 1:
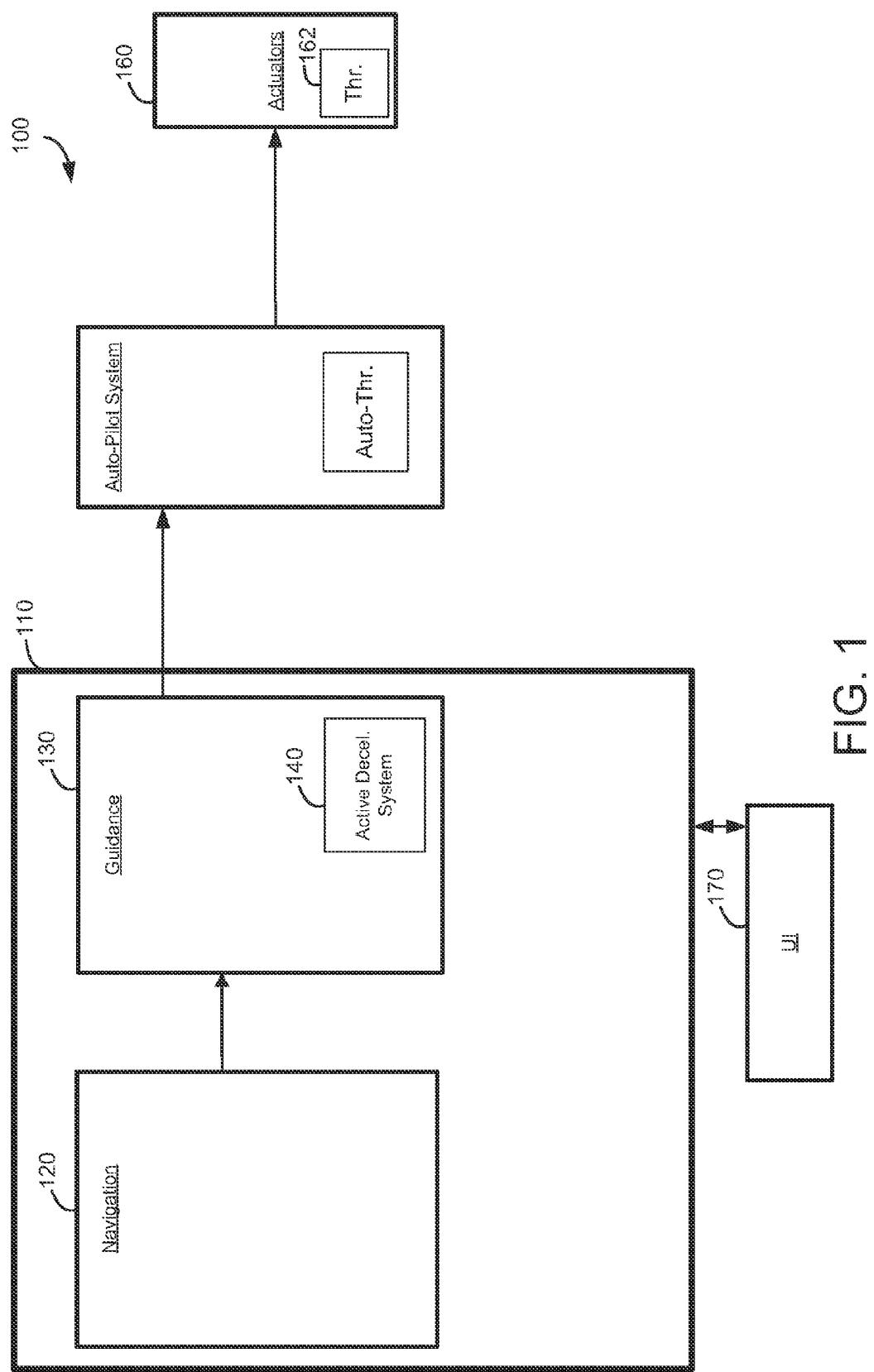
FIG. 1 is a block diagram of an aircraft system for controlling the flight of the aircraft in accordance with an exemplary embodiment.

FIG. 1 is a schematic block diagram of an aircraft system 100 for controlling the flight of an aircraft in accordance with an exemplary embodiment. In the illustrated embodiment, the aircraft system 100 includes a flight management system (FMS) 110, an auto-pilot system 150, aircraft actuators 160, and a user interface 170. As described in greater detail below, the FMS 110 includes a navigation system 120 and a guidance system 130 with an active deceleration system 140. The system 100 is particularly discussed as controlling the aircraft during a vertical descent or deceleration segment, although the exemplary embodiments discussed herein are equally applicable to other flight segments and scenarios.

Notably, it should be understood that although system 100 appears in FIG. 1 to be arranged as an integrated system, the exemplary embodiments are not so limited and can also include an arrangement whereby one or more of the components are separate components or subcomponents of another system located either onboard or external to an aircraft. For example, the auto-pilot system 150 may be incorporated into the FMS 110. Furthermore, the systems and methods are not limited to manned aircraft and can also be implemented for other types of vehicles, such as, for example, spacecraft or unmanned vehicles. The components of the system 100 are introduced below prior to a more detailed description of the active deceleration system 140.

The FMS 110 generally performs a wide variety of in-flight tasks during operation of the aircraft, including navigation and guidance of the aircraft respectfully implemented by the navigation system 120 and the guidance system 130. Although not specifically shown, the FMS 110, including the navigation system 120 and guidance system 130, may be implemented with one or more computer processors, such as for example, a microprocessor or digital signal processor capable of performing the functions discussed herein. The FMS 110 may further include a database with any elements necessary for the operation of the aircraft and the creation and implementation of a flight plan, including waypoints, airports, terrain information and applicable flight rules.

In general, the navigation system 120 determines the current kinematic state of the aircraft. As such, in the exemplary embodiment, the navigation system 120 includes any suitable position and direction determination devices, such as an inertial reference system (IRS), an air-data heading reference system (AHRS), radio navigation aids, or a global navigation satellite system (GNSS). For example, the navigation system 120 provides at least the current position and velocity of the aircraft to the guidance system 130. Other navigation information may include the current heading, current course, current track, altitude, pitch, and any desired flight information.

In general, the guidance system 130 uses various flight and engine models and algorithms to construct lateral and vertical profiles for various segments that make up a flight plan based on navigation information received from the navigation system 120 (e.g., the current position and velocity) and inputs from the pilot or other source (e.g., the desired destination). As examples, the guidance system 130 may generate the flight plan based on considerations for timing, position, altitude, speed targets, and fuel economy. The guidance system 130 may also consider aircraft-specific parameters such as weight, fuel, and atmospheric conditions. In one scenario, aspects of the flight plan may be dictated by Air Traffic Control (ATC) or the Federal Aviation Administration (FAA) rules.

The flight plan may include a number of segments between waypoints, each of which have an associated position, altitude, speed, and time that the aircraft is scheduled to fly. As such, the guidance system 130 generally constructs flight plan segments from a first state (e.g., a current or future location, altitude, speed and/or time) to a second state (e.g., a subsequent location, altitude, speed, and/or time). In one exemplary embodiment, the flight plan includes an altitude profile and a speed profile for each segment. The altitude profile is typically expressed as altitude with respect to distance to provide an indication about the appropriate altitude for a given location, e.g., at distances from a waypoint or other destination. The speed profile is typically expressed as a series of speed targets for the aircraft at given times and/or distances.

Figure 2:
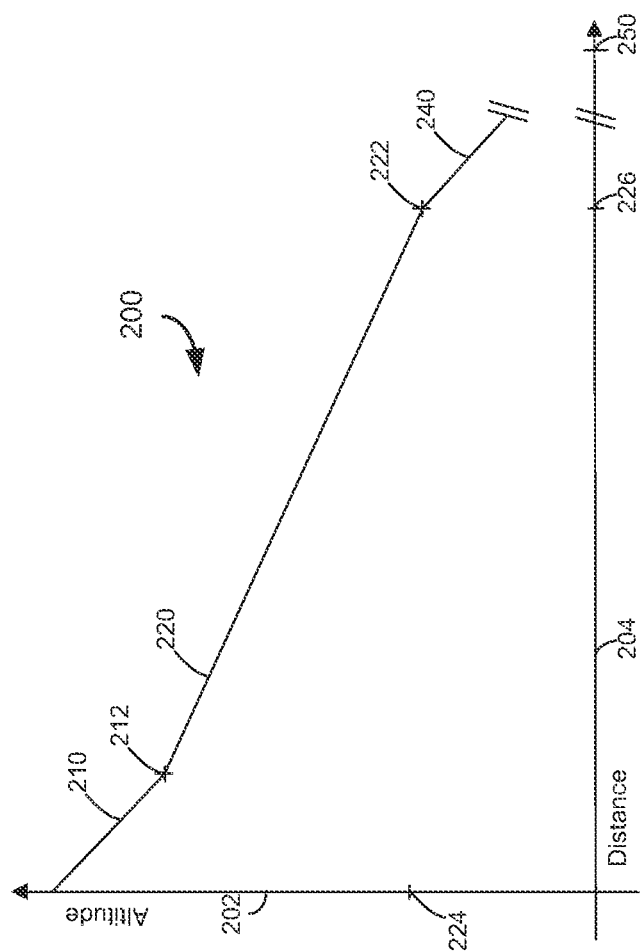
FIG. 2 is an exemplary altitude profile of a flight plan generated by the system of FIG. 1 in accordance with an exemplary embodiment.
Figure 3:
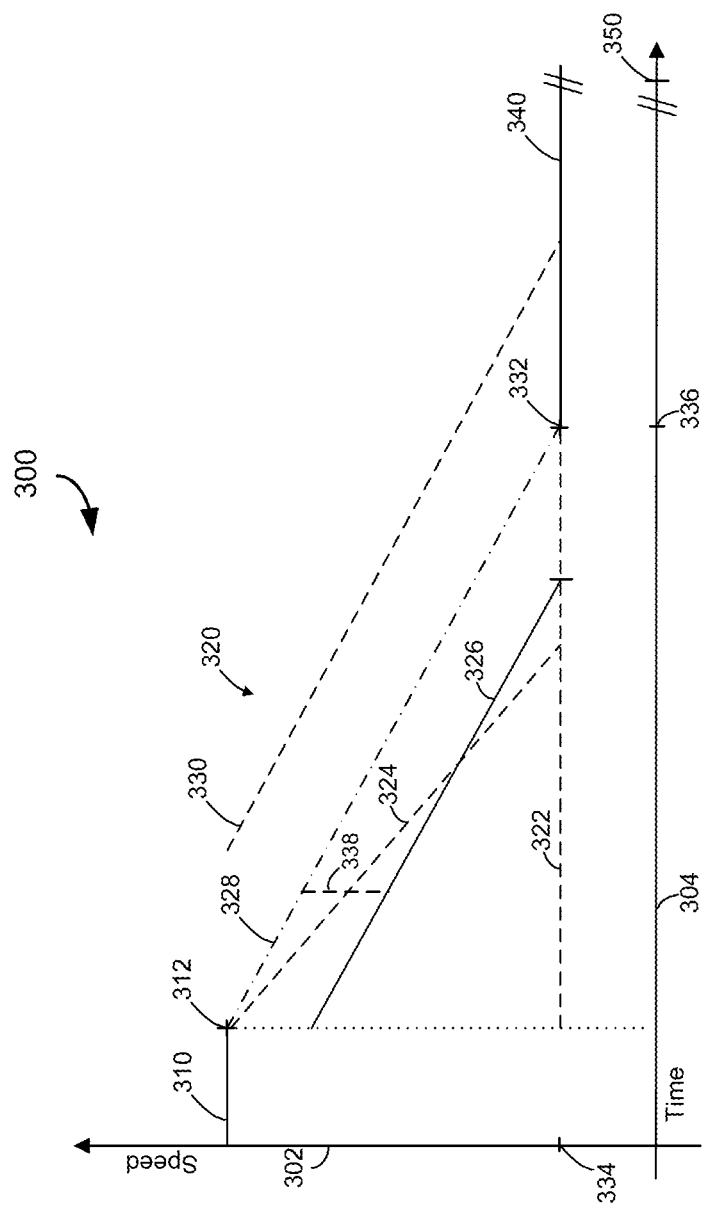
FIG. 3 is an exemplary speed profile of a flight plan generated by the system of FIG. 1 in accordance with an exemplary embodiment.

The active deceleration system 140 forms part of the guidance system 130 and particularly functions to generate the speed profile of the flight plans based on a number of considerations, including speed, altitude, location and timing requirements. As described in greater detail below, the active deceleration system 140 receives or determines aspects of the first state of the aircraft (e.g., the current speed and time) and the second state of the aircraft (e.g., the desired speed and time) and constructs the speed profile according to these and other considerations. Such considerations may include required time of arrival (RTA) requirements, thrust margin implementation, and recapture procedures. As described in greater detail below, FIGS. 2 and 3 are exemplary altitude and speed profiles 200 and 300 that may be generated by the guidance system 130 and that are used to describe the active deceleration system 140.

Returning to FIG. 1, the guidance system 130 provides the flight plan in the form of guidance commands to the auto-pilot system 150. For example, the commands generated by the guidance system 130 associated with the flight plan may include pitch commands, pitch rate commands, roll commands, and speed targets that function to implement the lateral and vertical profiles.

In response to receiving the guidance commands, the auto-pilot system 150 generates actuator commands that function to control the flight characteristics of the aircraft via the actuators 160. As examples, the actuator commands generated by the auto-pilot system 150 may include one of more of elevator commands, aileron commands, rudder commands, and speed brake commands. As shown in FIG. 1, the auto-pilot system 150 may include an auto-throttle module 152 that determines a throttle position commands to achieve the speed target of the flight plan.

The actuators 160 collectively include one or more aircraft components that, when controllably positioned, guide the movement of the aircraft, including the flight surfaces and associated drive components. As described above, the position of the actuators 160 are controlled by the commands of the auto-pilot system 150 or by commands from the pilot via the user interface 170. The number and type of actuators 160 included in an aircraft may vary. As examples, the actuators 160 may include elevators for adjusting the pitch of the aircraft, ailerons for adjusting the roll of the aircraft, and a rudder for adjusting the yaw of the aircraft respectively controlled according to the elevator commands, aileron commands, and rudder commands from the auto-pilot system 150 or from the pilot. The actuators 160 further include a throttle 162 that adjusts the speed of the aircraft by respectively increasing or decreasing power to the engine according to the throttle commands from the auto-throttle 152 of the auto-pilot system 150 or the pilot.

The system 100 additionally includes the user interface 170. The pilot or flight crew may initiate and modify the flight plan or flight commands of the guidance system 130 via the user interface 170. The user interface 170 may include any suitable hardware and software components that enable the pilot to interface with the system 100. Such components may include keyboards, mouse devices, buttons, switches, levers, and knobs. The user interface 170 may include a display unit capable of displaying various types of computer generated symbols and information, such as various CRT or flat panel display systems, such as LCDs, OLED displays, projection displays, plasma displays, HDDs, HUDs, and the like. The user interface 170 may be part of a multifunctional display unit, such as a primary flight display or mode control unit.

Now that the components of the aircraft system 100 have been generally described, the altitude and speed profiles generated by the guidance system 130 to provide optimized control of the aircraft during deceleration segments will be described in greater detail. FIG. 2 is a simplified altitude profile 200 of a flight plan generated by the guidance system 130 of FIG. 1 in accordance with an exemplary embodiment. As an example, FIG. 2 illustrates a portion of the altitude profile 200 for an aircraft flying to a destination 250. Altitude is indicated on the vertical axis 202 and distance is indicated on the horizontal axis 204. As noted above, the altitude profile 200 generally indicates the altitude that the aircraft should fly relative to the distance from the destination 250. In the portion illustrated in the depicted embodiment, the altitude profile 200 includes three segments 210, 220, and 240. Segment 210 generally corresponds to a first descent segment at which the aircraft is generally descending at a first rate. At a descent point 212, the aircraft is expected to descend along descent segment 220 until reaching point 222, which may correspond, for example, to a waypoint with an altitude constraint (e.g., altitude 224) at a location (e.g., at distance 226) and/or a speed constraint, as discussed in greater detail below. As such, at waypoint 222, the aircraft is expected to fly along segment 240 and subsequent segments (not shown) to destination 250. The altitude profile 200 may include pitch angles, roll angles, and pitch rates of change set by the pilot or the auto-pilot system 150 (FIG. 1) for implementation of the flight plan. Although not shown, the altitude profile 200 will typically have additional segments (e.g., DES mach, DES CAS, and additional descent and constant segments) before, after, or in between segments 210, 220, and 240.

FIG. 3 is a speed profile 300 that generally corresponds to the altitude profile 200 of FIG. 2. The speed profile 300 represents a series of speed targets that are provided to the auto-pilot system 150 to produce throttle commands that attempt to achieve those speed targets. In addition to the speed targets provided to the auto-pilot system 150, FIG. 3 also illustrates the projected trajectory segments of the aircraft based on those speed targets, e.g., the speed at which the aircraft would actually fly if those targets are provided to the auto-pilot system 150, as will be described in greater detail below. It should be noted that some of the speed targets and projected trajectory segments are illustrated in FIG. 3 to clarify operation of the active deceleration system 140 (FIG. 1) and, upon implementation, may not be calculated by the active deceleration system 140 or flown by the aircraft.

In FIG. 3, speed is represented on the vertical axis 302 and time is represented on the horizontal axis 304. Relative to the altitude profile 200, the speed profile 300 includes a first segment 310 in which the aircraft maintains a constant speed until a deceleration segment 320, which starts at a deceleration point 312. It should be noted that the particular position of the deceleration point 312 may vary based on the construction of the deceleration segment 320. In one embodiment, the deceleration segment 320 of the speed profile 300 corresponds to the descent segment 220 of FIG. 2 as the aircraft decelerates to a set point 332. The set point 332 is a set speed or speed constraint (e.g., speed 334) at a particular time (e.g., time 336). For example, the set speed 334 may be a speed constraint associated with the waypoint 222 that starts the set segment 240 of FIG. 2. In the description below, the time 336 and other associated parameters may be referred to as an RTA requirement that corresponds to the speed, location, and timing requirements of set point 332, e.g., generally corresponding to the 4D parameters that the aircraft is expected to meet.

Although not shown in FIG. 3, the speed profile 330 may incorporate a speed margin such that the imposed speed constraint at the set point 334 is above the actual speed associated with the set point, and the amount of speed margin may be modified based on conditions. In the particular depiction, any speed margin, if desired, is incorporated into the speed constraint 334. Additionally, the speed profile 330 may also be determined considering a thrust margin such that the constructed deceleration is slower compare to deceleration with an idle thrust. This thrust margin generally corresponds to the thrust provided by the auto-pilot system as the system 100 targets the speed profile speed minus the lead factor. In general, the thrust margin may provide a margin that enables the aircraft to adjust throttle positions during the flight or recapture of the speed profile.

As described in greater detail below, the active deceleration system 140 constructs speed profile segments that incorporate active deceleration, including procedures for RTA requirements, margin implementation, segment recapture, and the like. Further details about one exemplary construction of the deceleration segment 320, including prospective speed targets 322 and 326 and projected trajectory segments 324, 328, and 330, will be discussed below.

The speed profile 300 further includes a third segment 340 that corresponds to the segment 240 of FIG. 2 in which the aircraft is to maintain a constant speed (e.g., set speed 334) to the subsequent segments as the aircraft approaches a destination time 350. Accordingly, the altitude and speed profiles 200 and 300 collectively indicate the speed, altitude, location, and time at which the aircraft is expected to fly. The construction of the deceleration segment 320 will now be discussed.

Figure 4:
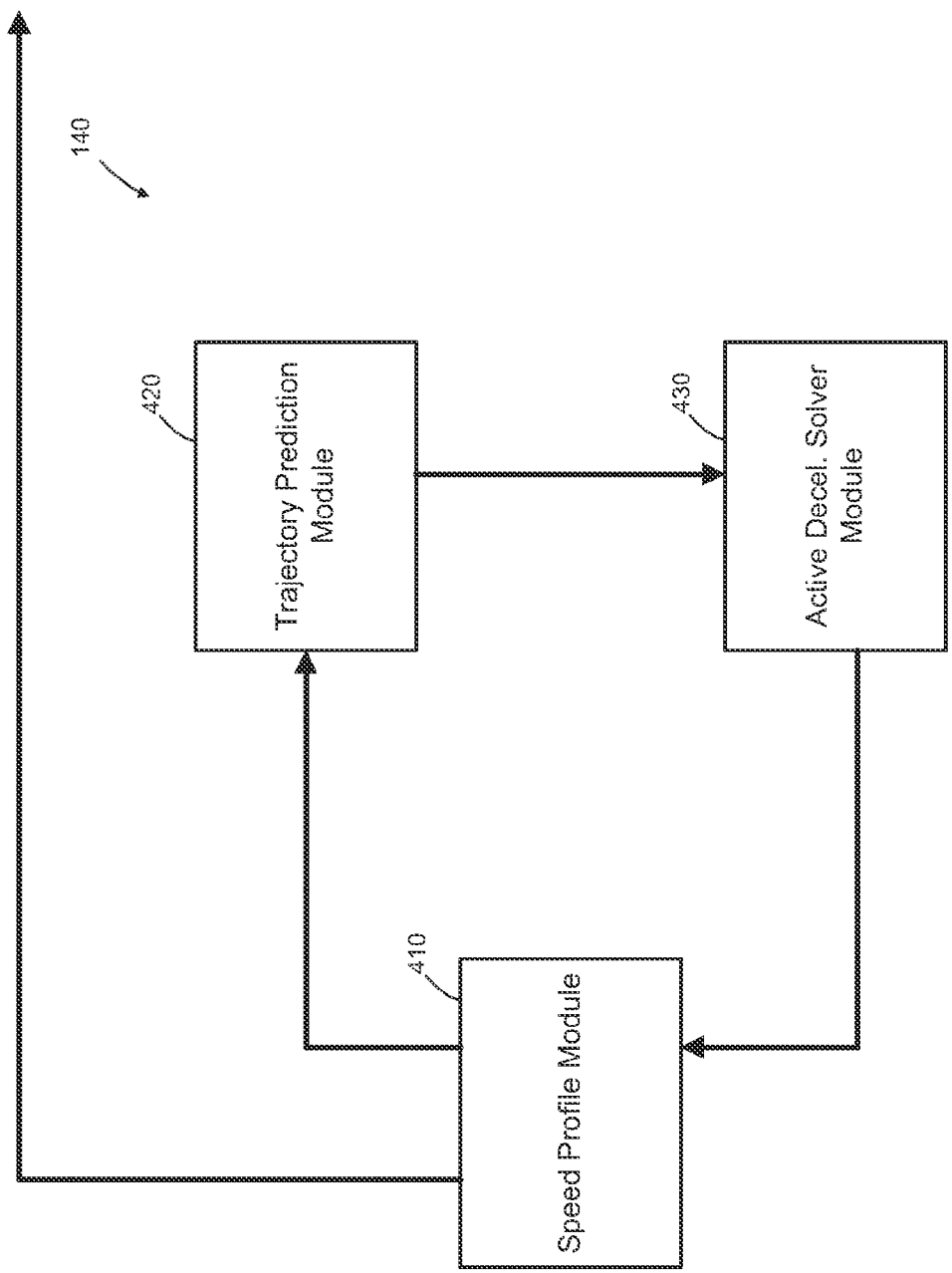
FIG. 4 is a block diagram of an active deceleration system of the system of FIG. 1 in accordance with an exemplary embodiment.

FIG. 4 is a more detailed view of the active deceleration system 140 of the guidance system 130 for constructing the speed profile of the aircraft during a descent, such as the deceleration segment 320 of FIG. 3. FIG. 4 will be discussed with reference to FIGS. 2 and 3. In general, the active deceleration system 140 assists the guidance system 130 (FIG. 1) in constructing flight plan segments from a first state (e.g., a current or future location, altitude, speed and/or time) to a second state (e.g., a subsequent location, altitude, speed, and/or time) at target speeds other than idle throttle. The active deceleration system 140 is described with respect to a number of modules 410, 420, and 430 (e.g., software, hardware, or combinations thereof). Specifically, each of the modules 410, 420, and 430 may be implemented to carry out specific functions. Accordingly, these modules 410, 420, and 430 may include processing units that execute machine instructions or algorithms stored in the database or local memory and retrieved and executed to perform the functions discussed herein. FIG. 4 depicts one exemplary organization, although other embodiments may perform similar functions with alternative organization or implementation.

As depicted, the active deceleration system 140 includes a speed profile module 410, a trajectory prediction module 420, and an active deceleration solver module 430. Initially, the speed profile module 410 calculates a nominal speed profile or receives the nominal speed profile from the other portions of the guidance system 130. The nominal profile typically includes the various speed restrictions associated with the flight plan, e.g., the speed restrictions associated with the altitudes, locations, and times of altitude and speed profiles 200 and 300 of FIGS. 2 and 3. For clarity in the discussion, a nominal deceleration segment 322 is shown in FIG. 3. In conventional guidance systems, the nominal deceleration segment 322 is the only consideration for construction of the deceleration segment 320. The nominal deceleration segment 322 generally sets the speed target to be equal to the speed restriction of the third segment 340 (or the segment 240 of the altitude profile 200). As such, a conventional guidance system may immediately set the speed target at the final, reduced speed, which would result in the auto-pilot system 150 (FIG. 1) setting the throttle 162 (FIG. 1) to idle until the speed target is reached. As such, as used herein, the "nominal" deceleration segment 322 is flat and is flown with an idle throttle. In general, the nominal deceleration segment 322 is most fuel efficient manner of flying the aircraft because of the idle throttle, and as such, may be desirable, if the other constraints such as speed and timing are satisfied, as discussed below.

During actual flight, the aircraft cannot react immediately to achieve the speed target because of physical or control system lags and limitations, thus resulting in a projected profile segment that differs from the speed target. This is particularly applicable to relatively large deviations in the speed targets, such as illustrated between the first segment 310 and the nominal deceleration segment 322. During such circumstances, if unaddressed, the resulting speed profile flown by the aircraft may be subject to uncertainty resulting due to wind conditions and other factors when flying with no throttle.

The speed profile module 410 may provide the speed targets of the speed profile 300, initially including the nominal deceleration segment 322, to the auto-pilot system 150 (FIG. 1). In addition to the nominal deceleration segment 322 initially provided to the auto-pilot system 150, the active deceleration system 140 functions to continuously update the speed targets of the speed profile 300 to provide a more predictable and accurate coordination of speed, altitude, location, and times.

The speed profile module 410 additionally provides the speed profile 300, initially including nominal deceleration segment 322, to the trajectory prediction module 420. The trajectory prediction module 420 predicts the trajectory that the aircraft will fly according to the speed profile 300 provided by the speed profile module 410. In the example of FIG. 3, the trajectory prediction module 420 generates a nominal projected trajectory segment 324 that corresponds to the nominal deceleration segment 322.

The active deceleration solver module 430 receives the projected trajectory segment and considers projected trajectory segment with consideration for active control. For example, the active deceleration solver module 430 may consider the projected trajectory segment with respect to the RTA requirements (e.g., if the projected trajectory segment 324 arrives at the speed constraint 334 at the set time 336 to satisfy the RTA requirements for this segment). If the RTA requirements will be satisfied by the projected trajectory segment, the active deceleration solver module 430 does not adjust the speed profile 300. However, in the example of FIG. 3, the projected trajectory segment 324 results in the aircraft arriving at the set speed 334 early, which would result in the aircraft arriving at the waypoint 222 late. Since the guidance system 130 and particularly the active deceleration system 140 attempt to coordinate speed, altitudes, locations, and times, this condition may be undesirable. In this situation (e.g., if the RTA requirements will not be satisfied by the projected trajectory segment), the active deceleration solver module 430 adjusts the speed profile 300 by interpolating a path to the speed constraint and incorporating a lead factor, as will be described in greater detail below If the projected trajectory segment (e.g., projected trajectory segment 324) does not achieve the active deceleration requirements (e.g., the aircraft is not expected to achieve the set speed 332 at the set time 336), the active deceleration solver module 430 initially constructs an interpolated segment 328 of speed targets from the deceleration point 312 to the set point 332 (e.g., to arrive at the set speed 332 at the set time 336). Generally, the interpolated segment 328 is a continuously changing series of speed targets that may require the use of throttle by the aircraft. As noted above, in conventional guidance systems, the deceleration segments are generally flown with idle throttle. As an example, the trajectory prediction module 420 interpolates a direct line between the deceleration point 312 and the set point 332, e.g., the interpolated segment 328 includes speed at the deceleration point 312, the speed 334 at the set point 332, and at least one of intermediate speed there between. As described in greater detail below, the active deceleration solver module 430 may generate interpolated segments in any suitable manner, typically constructed from the set point 334 backwards to any deceleration point based on considerations such as fuel economy and speed, timing, and altitude constraints.

The active deceleration solver module 430 further incorporates a lead factor 338 into the interpolated segment 328 to result in a lead deceleration segment 326. The lead factor 338 generally corresponds to the delay or lag in the control systems associated with the guidance or auto-pilot systems 130 or 150 for implementing a speed target, particularly a ramping speed target. In other words, if the speed targets of the interpolated segment 328 are provided to the auto-pilot system 150 (FIG. 1), it would result in a projected trajectory segment such as projected trajectory segment 330. As illustrated in FIG. 3, this projected trajectory segment 330 results in the aircraft arriving at the set speed 334 late, and thus, missing the set point 332 (e.g., which results in the aircraft arriving at the waypoint 222 early in FIG. 2). The lead factor 338 may be based on experimental data or derived based to the responsiveness of the guidance system 130 or auto-pilot system 150. Typically, the lead deceleration segment 326 is proportional to the interpolated segment 328 according to the lead factor 338. The lead factor 338 may be a function of a speed error or other consideration, such as the rate of deceleration segment. Accordingly, the lead deceleration segment 326 may be expressed as shown in Equation (1):

Lead Decel. Segment=(Lead Factor)*Interpolated Segment  (1)

As such, the lead deceleration segment 326 provides a series of speed targets that result in the aircraft actually flying the active profile to the set point 332, which in the view of FIG. 3 also corresponds to the interpolated segment 328. As noted above, the lead deceleration segment 326 generally includes a non-idle (or non-zero) throttle setting. The throttle settings of the lead deceleration segment 326 may increase the ability of the active deceleration system 140 in the current or subsequent iterations to actively control the deceleration segment 320, and thus, improves accuracy in the arrival at the set point 332. The lead deceleration segment 326 is provided to the speed profile module 410, which provides updated speed targets to the auto-pilot system 150 based on the lead deceleration segment 326.

In some embodiments, the active deceleration system 140 may implement the interpolated segment and/or the lead factor independently of the RTA requirements. For example, deceleration segments with a recapture procedure, lead factor, thrust margin, or speed margin may be constructed to provide additional control of the deceleration segment. Additionally, in alternate embodiments, the predicted trajectories may be constructed before the speed profiles such that the speed profiles are formed with backward integration from a waypoint. Further, in some embodiments, the lead factor may be applied before the interpolated segment.

As the aircraft continues flying the altitude and speed profiles 200 and 300 of FIGS. 2 and 3, the active deceleration system 140 continues to update the speed targets in an iterative process. For example, the trajectory prediction module 420 continues to generate predicted trajectories based on the current state of the aircraft, and if the active deceleration solver module 430 determines that a projected trajectory segment will not satisfy the RTA requirements (or if another active control consideration is desired), the active deceleration solver module 430 continues to adjust the speed profile to meet these requirements (e.g., that meets the speed constraint 334 at time 336), as will be discussed in greater detail below. In this manner, the active deceleration system 140 provides an active control of the deceleration segment 320. Additionally, since the updated state may not be exactly on the expected segment (e.g., corresponding in flight to the direct, interpolated segment 328) due to atmospheric conditions or discrepancies between the actual behavior of the aircraft and performance models, the active deceleration system 140 also provides speed targets to recapture a deceleration segment, including a lead deceleration segment, as discussed in greater detail below. This procedure continues until the aircraft reaches the set point 332, which also corresponds to the waypoint 222 of FIG. 2.

Figure 5:
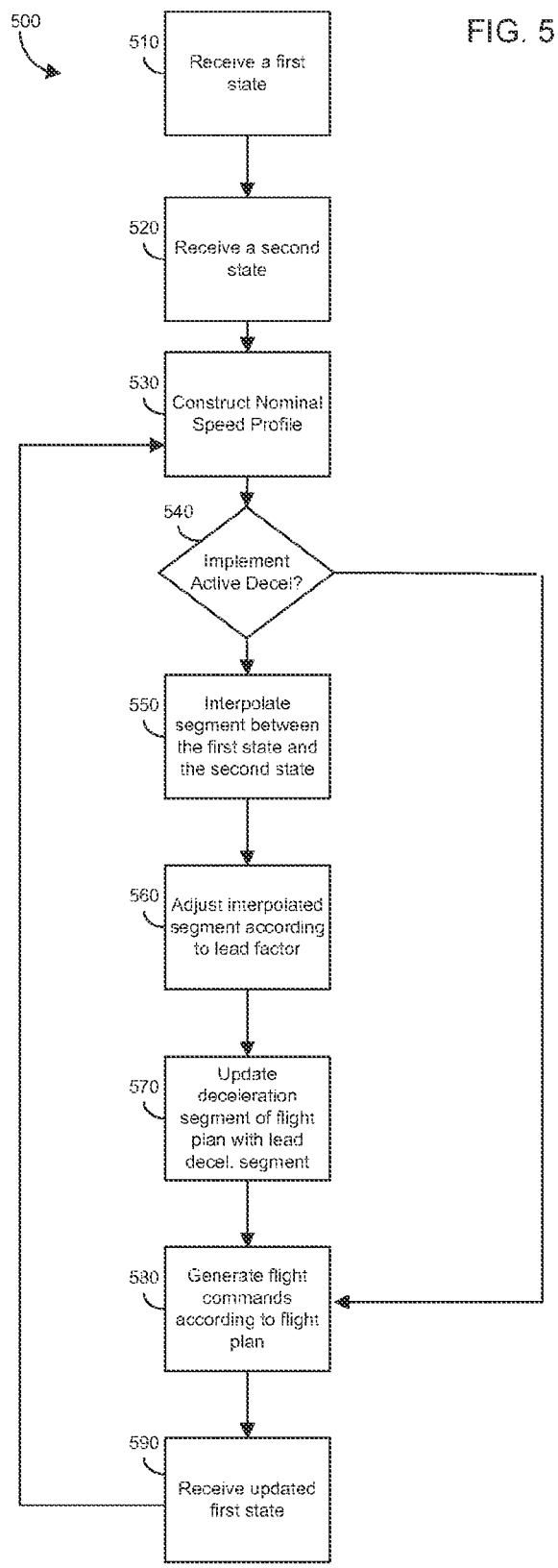
FIG. 5 is a flowchart of a method for controlling the deceleration in an aircraft in accordance with an exemplary embodiment.

FIG. 5 is a flowchart of a method 500 for controlling deceleration in an aircraft in accordance with an exemplary embodiment. As an example, the method 500 may be implemented with the system 100 of FIG. 1 and active deceleration system 140 of FIG. 4 to fly the profiles 200 and 300 of FIGS. 2 and 3, particularly as the aircraft is preparing to fly or in the process of flying the deceleration segment 320 of FIG. 3. As such, FIGS. 1-4 will be referenced below.

In a first step 510, the active deceleration system 140 receives the first state of the aircraft, which may include, for example, a current or future speed, altitude, location and time. In a second step 520, the active deceleration system 140 receives the second state of the aircraft, which may include, for example, a desired speed, altitude, location, and time.

In a third step 530, the active deceleration system 140 or another portion of the guidance system 130 may construct a nominal speed profile between the first and second states. As described above, the nominal speed profile may generally correspond to a speed profile with idle thrust such that the aircraft decelerates to a speed target. An example of the nominal speed profile is segment 322 in FIG. 3. In a fourth step 540, the active deceleration system 140 determines if active deceleration is to be implemented. The active deceleration parameters may be implemented to achieve RTA requirements, a recapture path, or generally, a more accurate control of the descent segment. As discussed above, the active deceleration system 140 predicts a trajectory that the aircraft is expected to fly according to the nominal profile. If the active deceleration system 140 predicts that the trajectory according to the nominal profile is satisfactory, the method 500 proceeds to step 580 in which the autopilot system 150 generates flight commands according to the flight plan with the nominal profile. If, however, in step 540, the active deceleration system 140 determines that the nominal profile will result in an RTA or other active deceleration issue, the method proceeds to step 550. In the example of FIG. 3, the nominal projected profile segment 324 does not meet the RTA requirements by achieving the set speed 334 at the set time 336.

In step 550, an interpolated segment (e.g., segment 328 in FIG. 3) is formed between the first and second states, e.g., a direct deceleration line of speed targets is generated between the speed of the first state and the speed of the second state. In a step 560, the active deceleration system 140 adjusts the interpolated segment 328 according to a lead factor to form a lead deceleration segment (e.g., segment 326 in FIG. 3). In a step 570, the active deceleration system 140 or another component of the guidance system 130 incorporates the lead deceleration segment 326 into the flight plan for implementation by the auto-pilot system 150. In a step 580, the auto-pilot system 150 generates the flight commands for the actuators 160 and the aircraft begins to fly the flight plan. In a step 590, the active deceleration system 140 receives an updated first state that generally corresponds to the current state of the aircraft and returns to the third step 530 to determine if the nominal profile is sufficient or if further adjustments to the speed profile are necessary as the aircraft flies the deceleration segment 320. Although the steps 510-590 are depicted as separate steps, at least some of the steps, such as steps 550 and 560, may be combined. As such, the active deceleration system 140 recalculates the speed profile 300 to provide an optimized and enhanced deceleration and descent segment.

Figure 6:
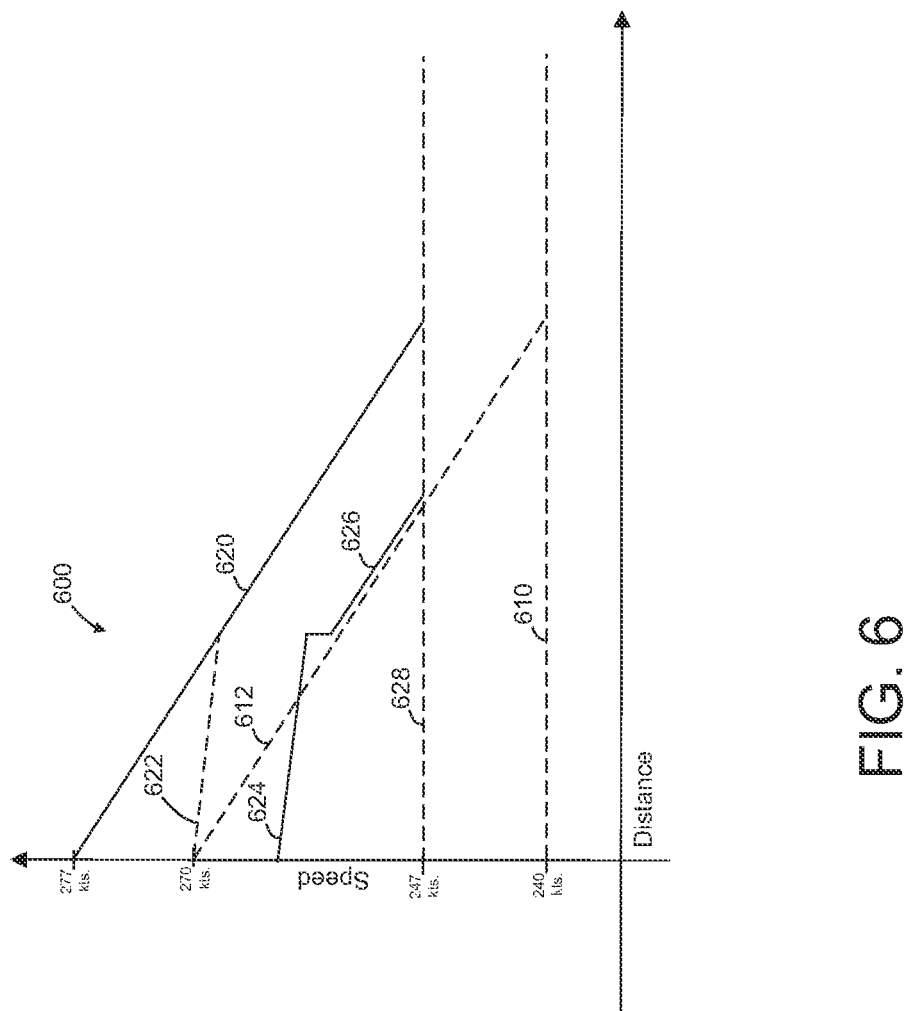
FIG. 6 is an exemplary speed profile of a flight plan generated by the system of FIG. 1 in accordance with an alternate exemplary embodiment.

The examples described above assumed that the aircraft is on-profile, e.g., that the current speed of the aircraft corresponds to the appropriate position on the current speed profile. In accordance with an exemplary embodiment, the active deceleration system 140 may also respond to an off-profile situation in which the aircraft is not on a current speed profile segment, an example of which is depicted in FIG. 6. FIG. 6 particularly illustrates a speed profile 620 at which an aircraft is initially decelerating from a current speed (e.g., 270 knots (kts)) to a speed constraint (e.g., 240 kts) over distance. In this example, the speed constraint of 240 kts includes a thrust margin of 10 kts relative to a speed constraint of 250 kts. As discussed above, thrust margins may be incorporated into some systems to provide additional margin relative to the actual speed constraints. In FIG. 6, the active deceleration system 140 initially provides a nominal deceleration segment 610 with speed targets of 240 kts. However, in this example, the active deceleration system 140 determines that the nominal projected trajectory segment 612 corresponding to the nominal speed target 610 does not satisfy the RTA or other active deceleration requirements. This situation may result in the thrust margin being adjusted, for example, resulting in a thrust margin of 3 kts. As such, in the depicted example, the adjustment of the thrust margin results in the active deceleration system 140 generating an interpolated segment 620 between 277 kts and 247 kts, e.g., the adjusted thrust margin results in a speed constraint of 247 kts. However, since the aircraft is currently at 270 kts, the aircraft is not initially on the interpolated profile segment 620. In response, the active deceleration system 140 constructs a recapture segment, as visually indicated by segment 622. Additionally, as described above, the recapture segment 622 may incorporate the lead factor to construct a lead recapture segment 624 that enables the aircraft to return to the interpolated profile segment 620 by accommodating for any lags in the control systems. In other words, the active deceleration system 140 provides speed targets corresponding to the lead recapture segment 624 such that the aircraft flies the recapture segment 622 to return to the interpolated profile 620. The recapture segment 622 and the lead recapture segment 624 may be based on a number of factors, including timing and speed requirements, as well as the reaction of the auto-pilot system 150 to changing speed targets.

When the recapture segment 622 reaches the interpolated segment 620 by flying the speed targets of the lead recapture segment 624, the active deceleration system 140 may function as described above, e.g., by continuing to fly the interpolated segment 620 with a lead interpolated segment such as segment 626, or if acceptable, according to a nominal segment 628. This recapture procedure is also applicable to any situation in which the current speed is not on the current speed profile, for example, if the current speed is above or below the current speed profile due to atmospheric conditions or discrepancies between actual aircraft behavior and performance models.

Accordingly, exemplary embodiments discussed herein provide a deceleration segment with a more accurate prediction, particularly a more accurate time prediction, of the end of the deceleration segment. For example, the aircraft system 100 may use an active, non-zero throttle setting to provide enhanced control the aircraft during the deceleration segment. The deceleration segments may be more consistent and provide improved results in descent path tracking and speed profile execution. Additionally, the aircraft system 100 may repeatedly recalculate the calculated path during the deceleration segment. The aircraft system 100 may also enable more accurate flying of the calculated speed profile by incorporating a lead factor into the throttle settings.

It is important to note that while exemplary embodiments have been described in the context of a fully functioning aircraft system, exemplary embodiments are further capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for controlling the speed of an aircraft during a deceleration segment between a first state associated with a first speed and a first time and a second state associated with a second speed and a second time, the system comprising:
    a navigation system configured to determine the first state;
    a guidance system configured to determine the second state; and
    an active deceleration system coupled to the navigation system and the guidance system and configured to construct the deceleration segment between the first state and the second state with at least one intermediate speed between the first speed and the second speed,
    wherein the first state is a first constant speed segment, the second state is a second constant speed segment, and the deceleration segment is an active continuously decelerating segment extending directly between the first state and the second state.

2. The system of claim 1, wherein the deceleration segment includes a series of changing speed targets.

3. The system of claim 2, wherein the active deceleration system is configured to generate throttle commands based on the changing speed targets.

4. The system of claim 3, wherein the active deceleration system is configured to generate the throttle commands with throttle settings greater than idle.

5. The system of claim 1, wherein the active deceleration segment is configured to construct the deceleration segment based on a thrust margin.

6. The system of claim 1, wherein the active deceleration system is configured to construct the deceleration segment by determining an interpolated segment between the first state and the second state.

7. The system of claim 6, wherein the active deceleration system is configured to construct the deceleration segment by adjusting the interpolated segment by a lead factor to produce a lead deceleration segment.

8. The system of claim 1, wherein the active deceleration system comprises
    a speed profile module configured to receive the first state and the second state and configured to generate a speed profile with a nominal deceleration segment between the first state and the second state,
    a trajectory profile module coupled to the speed profile module and configured to generate a projected trajectory segment based on the nominal deceleration segment, and
    an active deceleration solver module coupled to the trajectory profile module and configured to evaluate the projected trajectory segment based on a time constraint.

9. The system of claim 8, wherein the active deceleration solver module is further configured to, when the projected trajectory segment exceeds the time constraint, construct an interpolated segment between the first state and the second state and adjust the interpolated segment by a lead factor to produce a lead deceleration segment.

10. The system of claim 9, wherein the speed profile module is configured to replace the nominal deceleration segment with the lead deceleration segment.

11. A method for controlling the speed of an aircraft during a deceleration segment between a first state associated with a first speed and a first time and a second state associated with a second speed and a second time, the method comprising the steps of:
    receiving the first state and the second state;
    automatically constructing the deceleration segment between the first state and the second state with a series of changing speed targets; and
    flying the aircraft according to the deceleration segment,
    wherein the constructing step includes constructing the deceleration segment by determining an interpolated segment between the first state and the second state, wherein the determining steps includes determining a direct line between the first state and the second state.

12. The method of claim 11, wherein the constructing step includes constructing the deceleration with intermediate speed targets between the first speed and the second speed.

13. The method of claim 11, further comprising the step of generating throttle commands according to the deceleration segment, at least one of the throttle commands being greater than idle.

14. The method of claim 11, wherein the constructing step further includes adjusting the interpolated segment by a lead factor to produce a lead deceleration segment.

15. The method of claim 14, further comprising the step of providing the lead deceleration segment to an auto-pilot system.

16. The method of claim 15, further comprising the step of receiving a updated first state, and if the updated first state is off the deceleration segment, constructing a recapture segment from the updated first state to the deceleration segment.

17. The method of claim 14, wherein the adjusting step includes determining the lead factor based on a lag time associated with an aircraft control system.

18. An aircraft system for controlling the speed of an aircraft during a deceleration segment between a first state associated with a first speed and a first time and a second state associated with a second speed and a second time, the system comprising:
   a navigation system configured to determine the first state;
   a guidance system configured to determine the second state; and
   a required time of arrival (RTA) system coupled to the navigation system and the guidance system and comprising
      a speed profile module configured to receive the first state and the second state and configured to generate a speed profile with a nominal deceleration segment between the first state and the second state,
      a trajectory profile module coupled to the speed profile module and configured to generate a projected trajectory segment based on the nominal deceleration segment, and
      an RTA solver module coupled to the trajectory profile module and configured to evaluate the projected trajectory segment based on a time constraint, the RTA solver module further configured to, when the projected trajectory segment exceeds the time constraint, construct an interpolated segment between the first state and the second state and adjust the interpolated segment by a lead factor to produce an active lead deceleration segment, and the speed profile module configured to replace the nominal deceleration segment with the lead deceleration segment.

* * * * *

UNITED STATES PATENT AND TRADEMARK OFFICE
CERTIFICATE OF CORRECTION

PATENT NO. : 8,688,363 B2
APPLICATION NO. : 13/095093
DATED : April 1, 2014
INVENTOR(S) : Svoboda et al.

It is certified that error appears in the above-identified patent and that said Letters Patent is hereby corrected as shown below:

On the Title Page, Item (75) Inventors:

Jiri Svoboda, "Morristown, NJ (US)";
Mike Jackson, "Morristown, NJ (US)";
Michal Polansky, "Morristown, NJ (US)";
Erwan Paricaud, "Morristown, NJ (US)"

should be changed to

Jiri Svoboda, --Okr. Novy Jicin (CZ)--;
Mike Jackson, --Maple Grove, MN (US)--;
Michal Polansky, --Brno, South Moravia (CZ)--;
Erwan Paricaud, --Toulouse, Haute Garonne (FR)--

Signed and Sealed this
Tenth Day of June, 2014

Michelle K. Lee
*Deputy Director of the United States Patent and Trademark Office*